United States Patent
Gray et al.

(10) Patent No.: US 11,292,487 B2
(45) Date of Patent: Apr. 5, 2022

(54) METHODS AND SYSTEMS FOR CONTROLLING AUTOMATED DRIVING FEATURES OF A VEHICLE

(71) Applicant: GM GLOBAL TECHNOLOGY OPERATIONS LLC, Detroit, MI (US)

(72) Inventors: Jeremy P. Gray, Clarkston, MI (US); Nikhil L. Hoskeri, Ann Arbor, MI (US); Amit Batikoff, Petach Tikwa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 202 days.

(21) Appl. No.: 16/381,161

(22) Filed: Apr. 11, 2019

(65) Prior Publication Data

US 2020/0324786 A1    Oct. 15, 2020

(51) Int. Cl.
*B60W 50/14* (2020.01)
*B60W 40/105* (2012.01)
*B60W 40/06* (2012.01)
*B60W 50/00* (2006.01)

(52) U.S. Cl.
CPC ............ *B60W 50/14* (2013.01); *B60W 40/06* (2013.01); *B60W 40/105* (2013.01); *B60W 2050/0072* (2013.01)

(58) Field of Classification Search
CPC .... B60W 50/14; B60W 40/06; B60W 40/105; B60W 30/18154; B60W 60/0059; B60W 2050/0072; B60W 2552/15; B60W 2554/20
See application file for complete search history.

(56) References Cited

U.S. PATENT DOCUMENTS

| | | | | |
|---|---|---|---|---|
| 10,877,473 B2* | 12/2020 | Viswanathan | ........ | G05D 1/0027 |
| 2017/0057520 A1* | 3/2017 | Letwin | ................ | G05D 1/0061 |
| 2018/0090039 A1* | 3/2018 | Singireddy | ............ | G09F 21/04 |
| 2020/0108785 A1* | 4/2020 | Sweeney | ............. | G05D 1/0223 |
| 2020/0142067 A1* | 5/2020 | Wang | .................... | G01S 7/4808 |

* cited by examiner

*Primary Examiner* — Rachid Bendidi
(74) *Attorney, Agent, or Firm* — Lorenz & Kopf LLP (57) ABSTRACT

Systems and methods are provided for controlling a vehicle. In one embodiment, a method includes: determining, by a processor, road features of an upcoming road based on at least one of sensor data and map data; computing, by the processor, a required viewing angle of a sensor based on the road features; computing, by the processor, an operational envelope based on the required viewing angle and a sensor profile, wherein the operational envelope includes points along a map where the sensor can sense; and generating a control signal to disable autonomous control of the vehicle based on the operational envelope.

12 Claims, 6 Drawing Sheets

METHODS AND SYSTEMS FOR CONTROLLING AUTOMATED DRIVING FEATURES OF A VEHICLE

INTRODUCTION

The present disclosure generally relates to vehicles, and more particularly relates to methods and systems for managing automated driving features of a vehicle.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, sensors have limitations when implemented on a vehicle. Some limitations stem from the sensor's ability to view all areas of the environment. For example, certain areas of the environment may be blocked from a sensor's field of view by an element in the environment (e.g., a building, a tree, a vehicle, etc.). Implementing multiple sensors at various viewing angles, in an attempt to minimize the undetectable areas, can be costly.

Accordingly, it is desirable to provide improved systems and methods for understanding a sensor's limitations and managing the operation of automated features of the autonomous vehicle based on this understanding. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling a vehicle. In one embodiment, a method includes: determining, by a processor, road features of an upcoming road based on at least one of sensor data and map data; computing, by the processor, a required viewing angle of a sensor based on the road features; computing, by the processor, an operational envelope based on the required viewing angle and a sensor profile, wherein the operational envelope includes points along a map where the sensor can sense; and generating a control signal to disable autonomous control of the vehicle based on the operational envelope.

In various embodiments, the road feature includes road edges. In various embodiments, the road feature further includes a static object adjacent to the road edges. In various embodiments, the road feature further includes a dynamic object.

In various embodiments, the road feature includes a road grade. In various embodiments, the determining the operational envelope is based on comparison of the required viewing angle to a sensor profile. In various embodiments, the sensor profile defines right and left horizontal viewing boundaries of the sensor. In various embodiments, the sensor profile defines top and bottom vertical viewing boundaries of the sensor. In various embodiments, the sensor profile defines range viewing boundaries of the sensor. In various embodiments, the sensor profile is based on vehicle speed.

In another embodiments, a system includes: at least one sensor that generates sensor data associated with an environment of the vehicle; and a controller configured to, by a processor, receive the sensor data, determine road features of an upcoming road based on at least one of the sensor data and map data, compute a required viewing angle of a sensor based on the road features, compute an operational envelope based on the required viewing angle and a sensor profile, wherein the operational envelope includes points along a map where the sensor can sense, and generate a control signal to disable autonomous control of the vehicle based on the operational envelope.

In various embodiments, the road feature includes road edges. In various embodiments, the road feature further includes a static object adjacent to the road edges. In various embodiments, the road feature further includes a dynamic object.

In various embodiments, the road feature includes a road grade. In various embodiments, the determining the operational envelope is based on comparison of the required viewing angle to a sensor profile. In various embodiments, the sensor profile defines right and left horizontal viewing boundaries of the sensor.

In various embodiments, the sensor profile defines top and bottom vertical viewing boundaries of the sensor. In various embodiments, the sensor profile defines range viewing boundaries of the sensor. In various embodiments, the sensor profile is based on vehicle speed.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
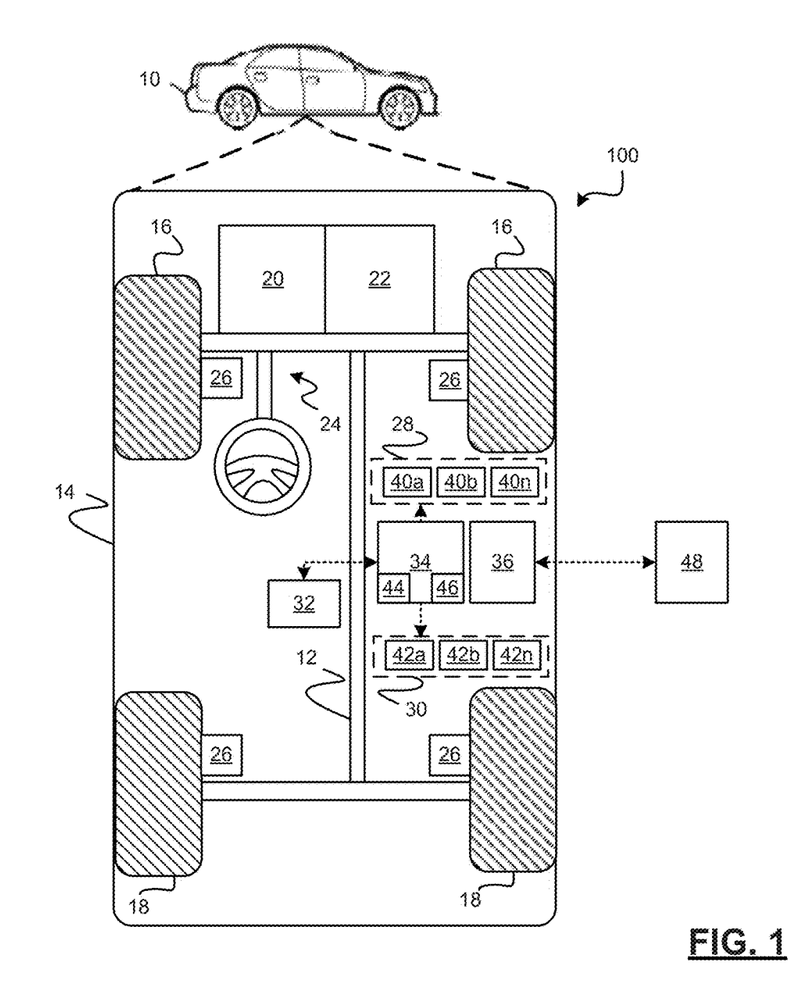
FIG. 1 is a functional block diagram illustrating an autonomous vehicle having an autonomous feature management system, in accordance with various embodiments.

With reference to FIG. 1, an autonomous feature management system shown generally at 100 is associated with a vehicle 10 in accordance with various embodiments. In general, the autonomous feature management system 100 processes data provided by one or more sensors disposed about the vehicle 10 and/or data stored in a map (as will be discussed in more detail below) to determine whether to enable or disable automated features of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the localization system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, or simply robots, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various other embodiments, the autonomous vehicle 10 can be any level of automation. For example, the autonomous vehicle can be a Level Two or other level system that includes an automated driving active safety system (ADAS).

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, sensor such as radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
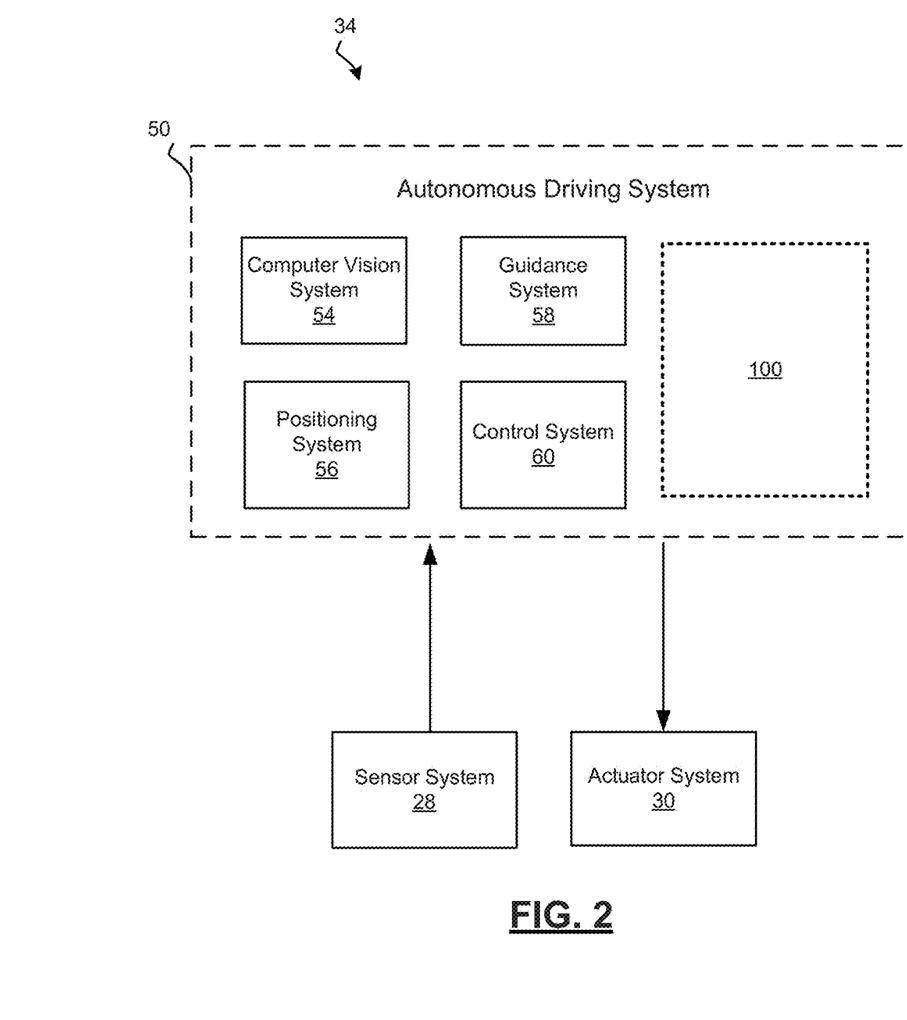
FIG. 2 is a dataflow diagrams illustrating an autonomous driving system that includes the autonomous feature management system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the autonomous feature management system 100.

As can be appreciated, the subject matter disclosed herein provides certain enhanced features and functionality to what may be considered as a standard or baseline autonomous vehicle 10 and/or an autonomous vehicle based remote transportation system (not shown) that coordinates the autonomous vehicle 10. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 50 as shown in FIG. 2 that, as discussed above, may implement any level of autonomous control. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from multiple sensors, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 60 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the autonomous feature management system 100 of FIG. 1 is included within the ADS 50, for example, as part of the vehicle control system 60 or as a separate system (as shown). For example, the autonomous feature management system 100 provides enablement/disablement criteria for allowing the vehicle control system 60 to control the vehicle 10. For example, when the disablement criteria are met, the vehicle control system 60 passes control of the vehicle 10 to non-automated systems (not shown).

Figure 3:
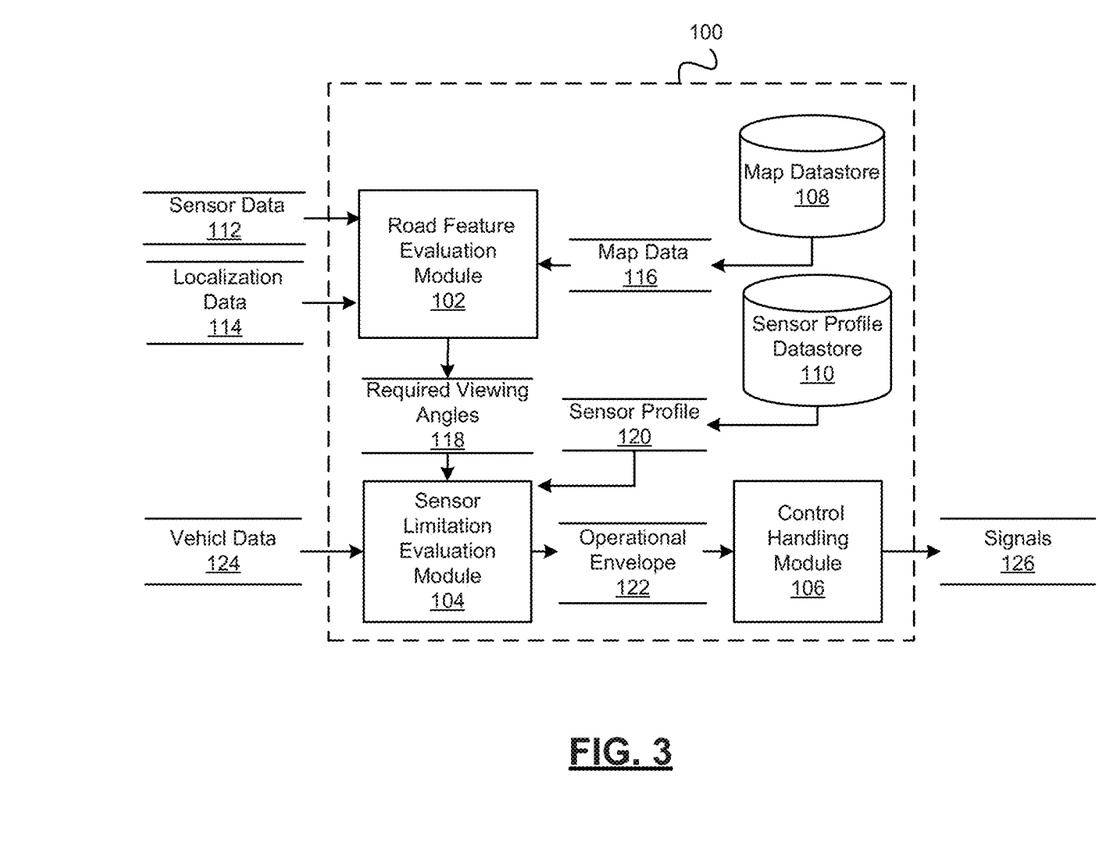
FIG. 3 is a dataflow diagram illustrating an autonomous feature management system, in accordance with various embodiments.

FIG. 3 illustrates the autonomous feature management system 100 in accordance with various exemplary embodiments. As shown in FIG. 3, the autonomous feature management system 100 may be implemented as one or more modules and/or sub-modules. As can be appreciated, the modules shown may be combined and/or further partitioned in various other embodiments. In various embodiments, the autonomous feature management system 100 can include a road feature evaluation module 102, a sensor limitation evaluation module 104, a control handling module 106, a map datastore 108, and a sensor profile datastore 110.

The road feature evaluation module 102 receives as input sensor data 112 from sensing devices 42a-42n including the cameras, lidars, radars etc., and receives localization data 114 indicating a current pose and heading of the vehicle 10. The input sensor data may be in the form of raw, low-level and/or high-level semantic detection data. The road feature evaluation module 102 retrieves map data 116 from the map datastore 108 (which may or may not be a part of the data storage device 46 FIG. 1) based on the location of the vehicle 10.

The road feature evaluation module 102 processes the received data to determine sensor coverage and detection requirements for the current or upcoming environment. For example, the road feature evaluation module 102 determines the vehicle's position relative to a map based on the map data 116 and the localization data 114 and extracts upcoming road features from the map 116. The road feature evaluation module 102 uses the location of the extracted road features to determine an actual location of the extracted road features and to compute a required viewing angle 118 for the sensor when the vehicle 10 is positioned at a given road location.

Figures 4, 5:
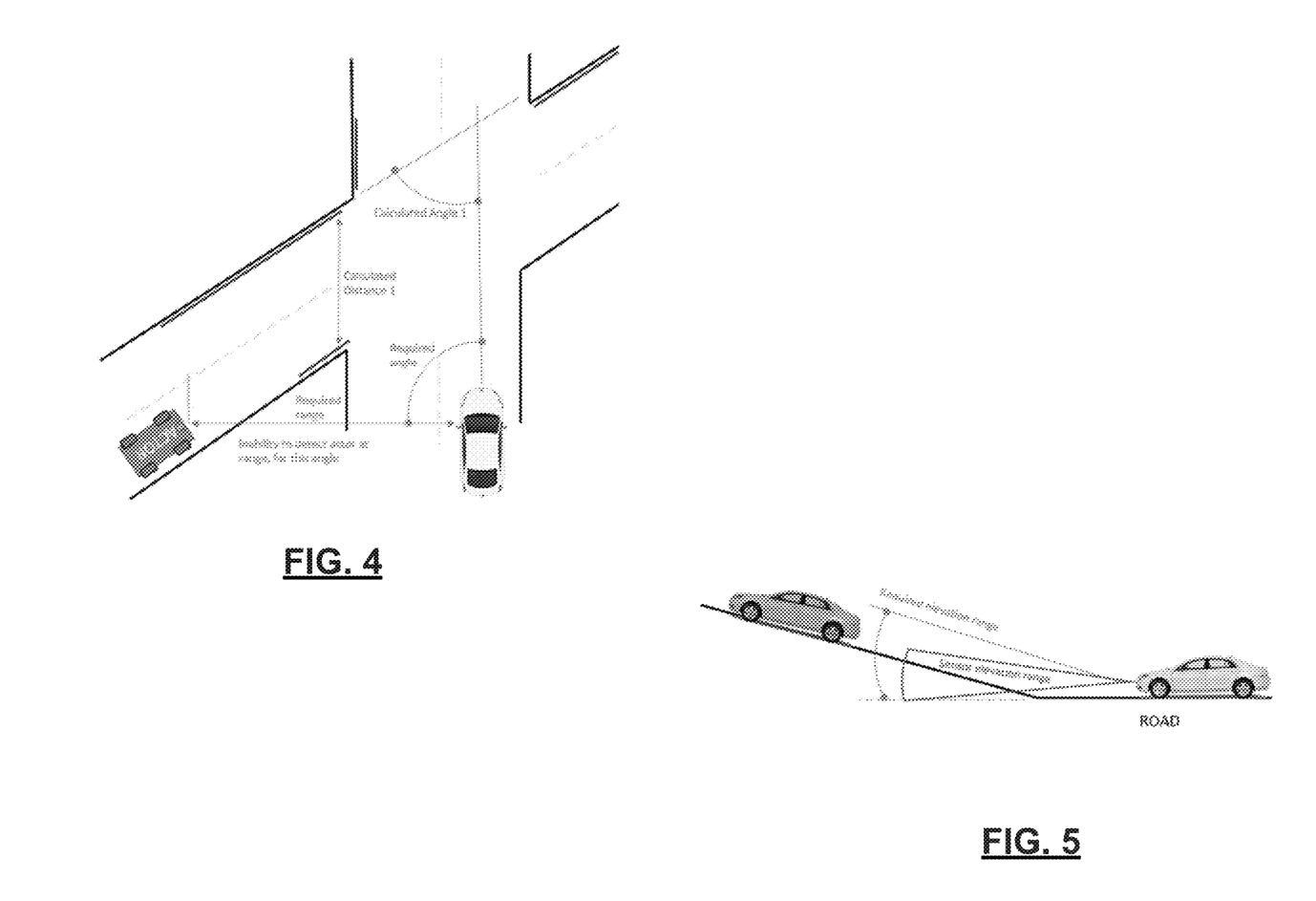
FIGS. 4, 5, 6, and 7 are illustrations of road features that can be detected by the autonomous feature management system, in accordance with various embodiments.

For example, as shown in FIG. 4, the extracted road features may include road edges. The location of the road edges as indicated by the map data 116 are used to compute the required viewing angle 118 for the vehicle 10 when the vehicle 10 is located at certain road locations. The required viewing angle 118 can be determined based on geometric and/or trigonometric functions.

Figure 6:
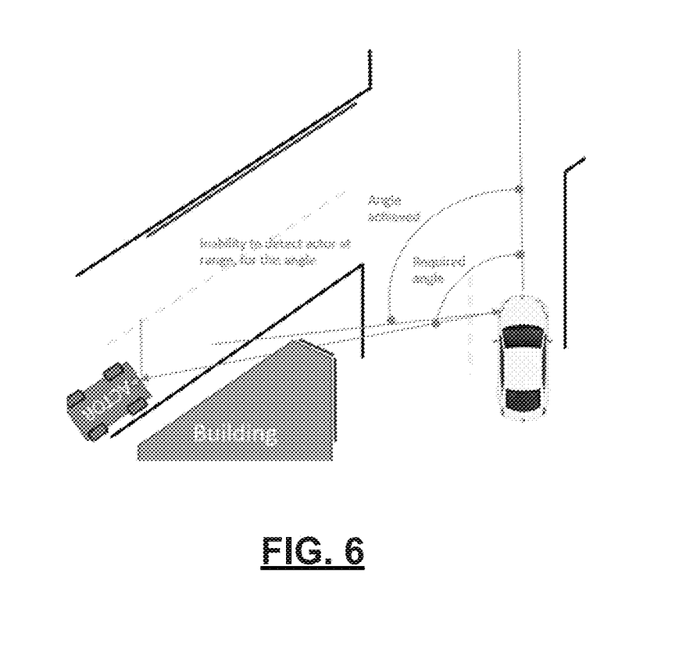

In another example, as shown in FIG. 5, the road features may include a road grade. The road grade at certain locations may be indicated by the map data 116. The road grade is used to compute the required viewing angle 118 for the sensor when the vehicle 10 is located at certain road locations. In another example, as shown in FIG. 6, the road features may include static objects such as buildings, signs, trees, etc. adjacent to the road edges. The location of the static objects and the road edges as indicated by the computed sensor data and/or map data 116 are used to compute the required sensor distance and angles 118 for the scene/environment when the vehicle 10 is at certain road locations.

With reference back to FIG. 3, in various embodiments, the road feature evaluation module 102 determines upcoming road features from the sensor data 112 in addition to or as an alternative to the map data 116. For example, the road feature evaluation module 102 performs one or more machine learning techniques to extract and classify objects in the environment. The road feature evaluation module 102 then defines a location of the classified objects relative to the retrieved map. In various embodiments, the objects can include the road edges, the road grade, and/or the static objects and the required viewing angles 118 are computed as discussed above.

For example, the sensor data 112 may processed by performing regression techniques on the pose of the road features using a deep neural network to learn the ratio between different road features, like the curb size, in two different points, and provide the road edge angle, with regards to the observation angle. If the sensor provides semantic object data, than the semantic objects will contain position information with respect to the autonomous vehicle's origin. Once the position information is obtained, geometry and/or trigonometry functions can be used to derive the required angles and distances. The distance may be further based on the vehicles internal processing limitations (delays/latency) and the current speed of the vehicle 10.

In another example, a road profile/surface angle can be calculated using the sensor data 112 by means of semantically locating the road features using segmentation methods, which can be based on deep neural network or other segmentation approaches, and fitting a plane to the road features.

Figure 7:
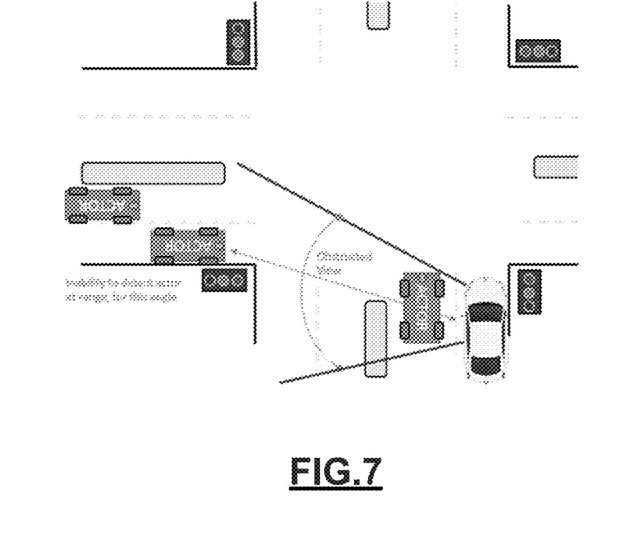

In various embodiments, the identified objects can include dynamic objects such as, but not limited to, vehicles, construction equipment, or other objects that may move and obstruct the view of the sensors. For example, as shown in FIG. 7, the location of the dynamic objects and the road edges as indicated by the sensor data 112 are used to compute the required viewing angle 118 for the sensor when the vehicle 10 is at certain road locations.

With reference back to FIG. 3, the sensor limitation evaluation module 104 receives the required viewing angles 118 for upcoming locations of the vehicle 10 along the road. The sensor limitation evaluation module 104 retrieves a sensor profile 120 from the sensor profile datastore 110. The sensor profile 120 indicates viewing boundaries of a sensor, or a system of sensors. The viewing boundaries can include left and right vertical boundaries, top and bottom horizontal boundaries, and/or range boundaries. In various embodiments, multiple sensor profiles 120 can be implemented per vehicle 10, depending on the number of sensors implemented, and the boundaries of the sensor profiles 120 may overlap. In such embodiments, multiple sensor profiles 120 may be retrieved and processed. Alternatively, a single sensor profile 120 can include a three dimensional coverage map based on all of the sensors mounted on the vehicle 10, where each sensor has its own field-of-view, and detection limits or coverage capability. In various embodiments, the boundaries of the sensor profiles 120 may be based on vehicle conditions, such as speed, or other conditions. In such embodiments, a sensor profile 120 may be retrieved based on received vehicle data 124.

The sensor limitation evaluation module 104 compares the required viewing angles 118 to the sensor profile(s) 120 to determine whether a required viewing angle 118 is outside of the boundaries set in the sensor profile(s) 120. Based on the comparisons, the sensor limitation evaluation module 104 generates an available operational envelope 122 of the vehicle 10. The available operational envelope 122 indicates at which points along the map the sensors of the vehicle 10 can cover given the current sensor configuration and limitations.

The control handling module 106 receives the operational envelop 122. The control handling module 106 selectively controls autonomous operation of the vehicle 10 based on the values of the operational envelope 122. For example, when the values indicate that the sensors are limited at an upcoming location, that is, the sensors are unable to view the required field identified at the upcoming location, the control handling module 106 generates signals 126 to pass control to the driver or other systems. When the values indicate that the sensors are not limited, the control handling module 106 generates control signals 126 to permit autonomous control of the vehicle 10. In some conditions, based on the nature or severity of the operational envelope 122, control signals can be sent to a driver to begin the transfer of vehicle control from the autonomous system, to the driver, thus disabling the autonomous system.

Figure 8:
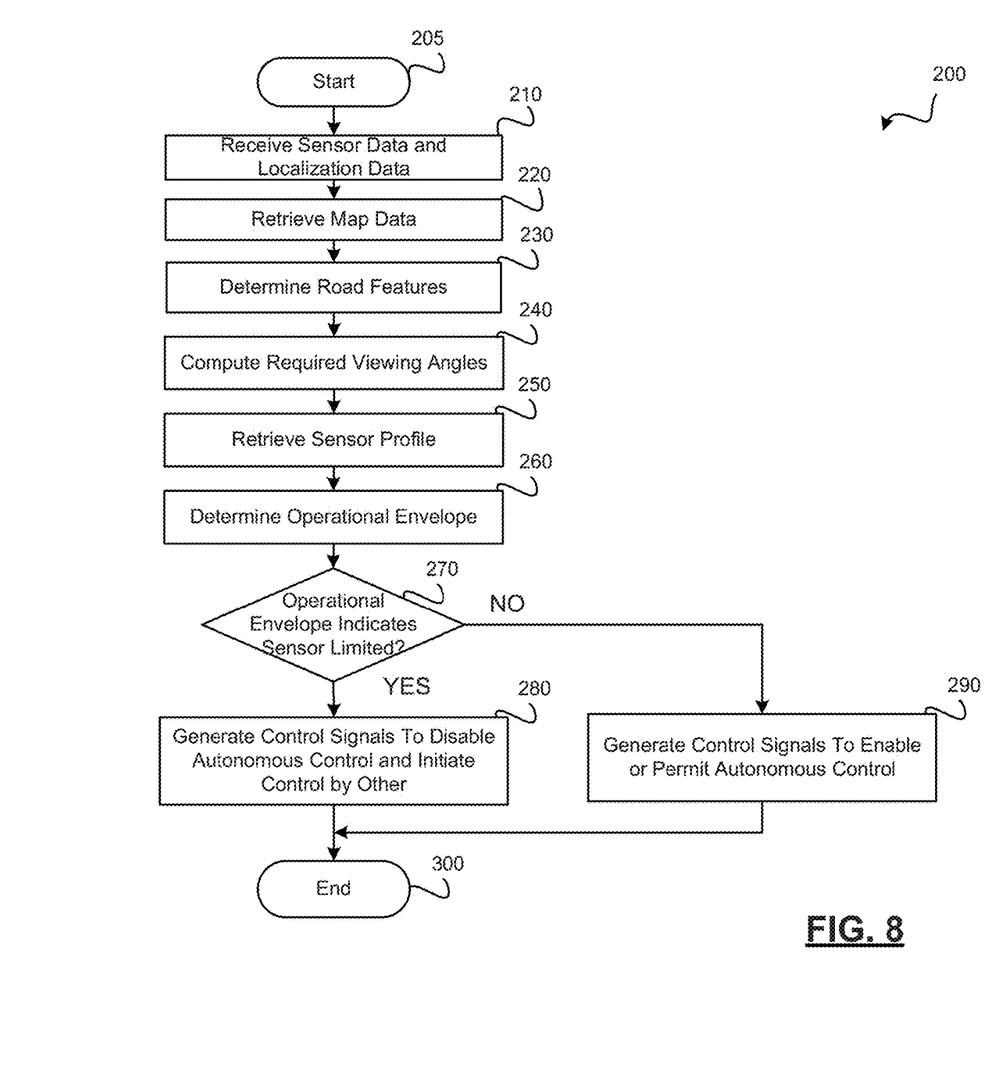
FIG. 8 is a flowchart illustrating an autonomous feature management method that may be performed by the feature management system, in accordance with various embodiments.

With reference now to FIG. 8 and with continued reference to FIGS. 1-3, a flowchart illustrates an autonomous feature management method 200 that can be performed by the autonomous feature management system 100 in accordance with various embodiments. As can be appreciated, in light of the disclosure, the order of operation within method 200 is not limited to the sequential execution as illustrated in FIG. 8 but may be performed in one or more varying orders as applicable and in accordance with the present disclosure. In various embodiments, the method 200 can be scheduled to run based on one or more predetermined events, and/or can run continuously during operation of the autonomous vehicle 10.

In one example, the method 200 may begin at 205. The sensor data 112 and the localization data 114 are received at 210. The map data 116 is retrieved based on the location of the vehicle 10 indicated by the localization data 114 at 220. The road features are extracted from the sensor data 112 and/or the map data 114, for example as discussed above, at 230. The required viewing angles 118 are computed for a number of locations along the road based on the road features, for example as discussed above at 240.

Thereafter, the sensor profile 120 is retrieved from the vehicle 10 saved within sensor profile datastore 110, at 250. The operational envelope 122 is determined based on the current vehicle conditions indicated by the vehicle data 124 and a comparison of the required viewing angles 118 and the sensor profile 120 at 260.

Thereafter, the operational envelope 122, which contains the required viewing angles 118 at 260, is evaluated to determine whether the sensors are limited in the upcoming environment at 270. If the sensors are limited at an upcoming location in the environment at 270, the control signals 126 are generated to disable autonomous control and initiate control by another at 280. If the sensors are not limited at an upcoming location at 270, the control signals 126 are generated to permit or enable autonomous control by the ADS 70 at 290. Thereafter, the method may end at 300.

As can be appreciated, in various embodiments, the sensor data 112 may not be received and the road features are determined solely from the map data 16. As can further be appreciated, in various embodiments, the map data 116 may not be retrieved and the road features are determined solely from the sensor data 112. As can further be appreciated, other alternatives may be implemented in the method 200 in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle, comprising:
   as the vehicle is travelling along a road,
   receiving, by a processor of the vehicle, sensor data from a sensor of the vehicle;
   determining, by a processor, road features of an upcoming road based the sensor data and map data, wherein the road feature includes a road edge and at least one of a static object adjacent to the road edge and a dynamic object;
   computing, by the processor, a viewing angle of the sensor that is required to view the road features of the upcoming road based on at least one of a geometric function and a trigonometric function, and location parameters associated with the road features;
   computing, by the processor, an operational envelope based on a comparison of the computed viewing angle and a sensor profile, wherein the operational envelope includes points along a map where the sensor can sense;
   generating a control signal based on the operational envelope; and
   disabling autonomous control of the vehicle based on the control signal.

2. The method of claim 1, wherein the road feature includes a road grade.

3. The method of claim 1, wherein the sensor profile defines right and left horizontal viewing boundaries of the sensor.

4. The method of claim 1, wherein the sensor profile defines top and bottom vertical viewing boundaries of the sensor.

5. The method of claim 1, wherein the sensor profile defines range viewing boundaries of the sensor.

6. The method of claim 1, wherein the sensor profile is based on vehicle speed.

7. A system for controlling a vehicle, comprising:
   at least one sensor that generates sensor data associated with an environment of the vehicle; and
   a controller configured to, by a processor, as the vehicle is travelling along a road, receive the sensor data, determine road features of an upcoming road based on the sensor data and map data, wherein the road feature includes road features a road edge and at least one of a static object adjacent to the road edge and a dynamic object, compute a viewing angle of a sensor that is required to view the road features of the upcoming road based on at least one of a geometric function and a trigonometric function, and location parameters associated with the road features, compute an operational envelope based on comparison of the computed viewing angle and a sensor profile, wherein the operational envelope includes points along a map where the sensor can sense, generate a control signal based on the operational envelope, and disable autonomous control of the vehicle based on the control signal.

8. The system of claim 7, wherein the road feature includes a road grade.

9. The system of claim 7, wherein the sensor profile defines right and left horizontal viewing boundaries of the sensor.

10. The system of claim 7, wherein the sensor profile defines top and bottom vertical viewing boundaries of the sensor.

11. The system of claim 7, wherein the sensor profile defines range viewing boundaries of the sensor.

12. The system of claim 7, wherein the sensor profile is based on vehicle speed.

* * * * *